United States Patent
Nakao

(10) Patent No.: US 7,389,170 B2
(45) Date of Patent: Jun. 17, 2008

(54) METHOD AND APPARATUS FOR JUDGING ROAD SURFACE CONDITIONS AND PROGRAM FOR JUDGING ROAD SURFACE CONDITIONS

(75) Inventor: Yukio Nakao, Kobe (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 427 days.

(21) Appl. No.: 10/704,909

(22) Filed: Nov. 12, 2003

(65) Prior Publication Data

US 2004/0098187 A1    May 20, 2004

(30) Foreign Application Priority Data

Nov. 13, 2002    (JP)    ............... 2002-329278

(51) Int. Cl.
    *B60T 7/12*    (2006.01)
(52) U.S. Cl. ............................ 701/80; 701/71; 701/79; 340/466
(58) Field of Classification Search ................ 701/200, 701/207, 213–215, 70, 72, 79, 89–90, 71, 701/80; 340/901, 905, 438, 447, 466–467; 180/116, 119; 73/9, 146, 178 R, 179; 303/139, 303/149–150
See application file for complete search history.

(56) References Cited

U.S. PATENT DOCUMENTS

| | | | | |
|---|---|---|---|---|
| 5,944,392 A | * | 8/1999 | Tachihata et al. | ........... 303/112 |
| 5,982,325 A | * | 11/1999 | Thornton et al. | ...... 342/357.07 |
| 6,092,005 A | * | 7/2000 | Okada | ............................ 701/1 |
| 6,092,014 A | * | 7/2000 | Okada | ........................ 701/70 |
| 6,359,571 B1 | * | 3/2002 | Endo et al. | .................. 340/988 |
| 6,470,263 B2 | * | 10/2002 | Ito et al. | ...................... 701/201 |
| 6,577,941 B2 | * | 6/2003 | Kawasaki et al. | ............. 701/70 |
| 6,577,943 B2 | * | 6/2003 | Nakao et al. | .................. 701/80 |
| 6,604,040 B2 | * | 8/2003 | Kawasaki et al. | ............ 701/80 |
| 6,617,980 B2 | * | 9/2003 | Endo et al. | .................. 340/905 |
| 6,873,898 B1 | * | 3/2005 | Kostadina | ..................... 701/91 |
| 2001/0029420 A1 | * | 10/2001 | Kawasaki et al. | ............ 701/80 |
| 2001/0045891 A1 | * | 11/2001 | Nakao et al. | ................ 340/426 |
| 2003/0033071 A1 | * | 2/2003 | Kawasaki | ...................... 701/80 |
| 2003/0078717 A1 | * | 4/2003 | Kawasaki et al. | ............ 701/80 |

FOREIGN PATENT DOCUMENTS

| | | |
|---|---|---|
| DE | 101 24 236 A1 | 7/2002 |
| EP | 0 994 449 A2 | 4/2000 |
| JP | 2000-82198 A | 3/2000 |
| JP | 2001-253334 A | 9/2001 |
| JP | 2001-334920 A | 12/2001 |
| JP | 2001334920 A | 12/2001 |
| JP | 2002-8198 A | 1/2002 |
| JP | 2002219957 A | 8/2002 |
| WO | WO 02/081250 A1 | 10/2002 |

* cited by examiner

Primary Examiner—Gertrude A. Jeanglaude
(74) Attorney, Agent, or Firm—Birch, Stewart, Kolasch & Birch, LLP

(57) ABSTRACT

A method, apparatus and program for judging road surface conditions on which a vehicle is running. The method, apparatus and program includes the steps of: obtaining wheel speed rotational information of driving wheels of the vehicle during running from wheel speed detectors, receiving GPS radio waves to calculate positional information, and judging road surface conditions during running on the basis of a relationship between the wheel speed rotational information and the positional information. Conditions of road surfaces on which a vehicle is running can be accurately judged.

18 Claims, 3 Drawing Sheets

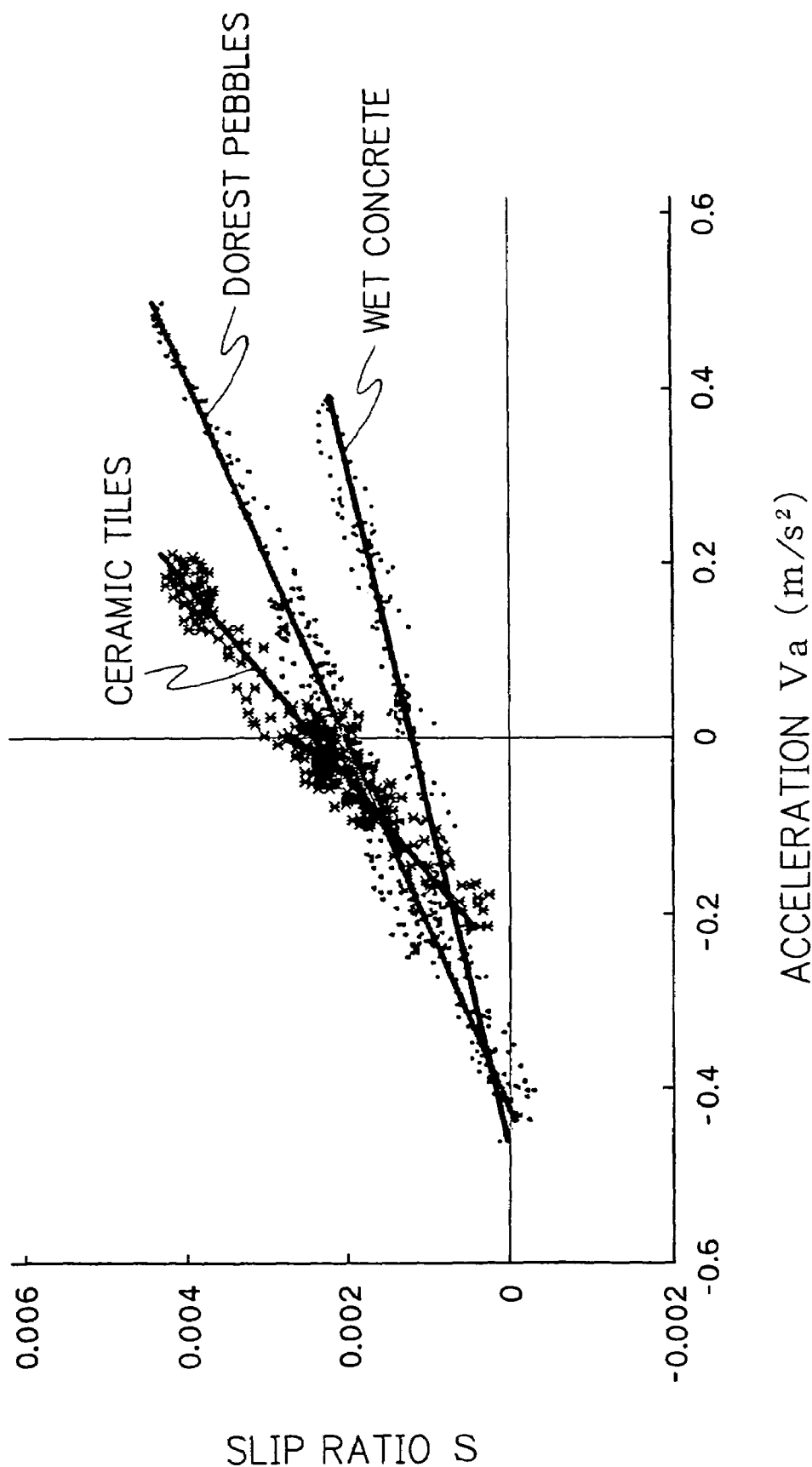

METHOD AND APPARATUS FOR JUDGING ROAD SURFACE CONDITIONS AND PROGRAM FOR JUDGING ROAD SURFACE CONDITIONS

BACKGROUND OF THE INVENTION

The present invention relates to a method and apparatus for judging road surface conditions and to a program for judging road surface conditions. More particularly, it relates to a method and apparatus for judging road surface conditions and to a program for judging road surface conditions with which it is possible to judge road surface conditions during running particularly in four-wheel-drive vehicles.

Antilock braking devices have been conventionally proposed in which locked conditions of wheels are prevented by decreasing braking torque acting on the wheels prior to occurrence of a condition in which the tires are locked with the braking force between tires and the road surface exceeding a maximum value to thereby control the rotational number of the wheels with which maximum braking force can be obtained. In such an antilock braking device, it is possible to employ a method for judging coefficients of road surface friction in which, for instance, a relational expression between an acceleration of the vehicle and a slip ratio is obtained whereupon a slope of this relational expression is compared with a preliminarily set threshold, and the coefficient of friction between the road surface and tires is judged on the basis of the result of this comparison (see Japanese Unexamined Patent Publication No. 2001-334920).

However, in a relationship between the acceleration of the vehicle and the slip ratio in such a method for judging coefficients of road surface friction, a gradient of μ-s curve of the road surface and the tires is obtained on the basis of the acceleration of the vehicle obtained from a rotational velocity of the following wheels and a tendency of slip of the road surface is judged accordingly so that a drawback is presented that this method is not applicable to four-wheel-drive vehicles.

SUMMARY OF THE INVENTION

The present invention has been made in view of the above facts, and it is an object thereof to provide a method and apparatus for judging road surface conditions and a program for judging road surface conditions which are capable of judging road surface conditions during running also in a four-wheel-drive vehicle.

According to a first aspect of the present invention, there is provided a method for judging road surface conditions for judging road surface conditions on which a vehicle is running. The method includes the steps of: obtaining wheel speed rotational information of driving wheels of the vehicle during running from wheel speed detecting means, receiving GPS radio waves to calculate positional information, and judging road surface conditions during running on the basis of a relationship between the wheel speed rotational information and the positional information.

According to a second aspect of the present invention, there is provided an apparatus for judging road surface conditions for judging road surface conditions on which a vehicle is running. The apparatus includes wheel speed detecting means which detect wheel speed rotational information of tires of driving wheels of the vehicle, a GPS device which receives GPS radio waves and calculates positional information, and a road surface condition judging means which judges road surface conditions during running on the basis of a relationship between the wheel speed rotational information and the positional information.

According to a third aspect of the present invention, there is provided a program for judging road surface conditions in which for judging road surface conditions, a computer is made to function as a road surface condition judging means which judges road surface conditions during running on the basis of a relationship between wheel speed rotational information of tires of driving wheels of the vehicle obtainable from wheel speed detecting means and positional information of the vehicle obtainable from a GPS device which receives GPS radio waves to calculate positional information.

According to a fourth aspect of the present invention, there is further provided a method for judging road surface conditions for judging road surface conditions on which a vehicle is running. The method includes the steps of: obtaining wheel speed rotational information of driving wheels of the vehicle during running from wheel speed detecting means, receiving GPS radio waves to calculate information on vehicle velocity, and judging road surface conditions during running on the basis of a relationship between the wheel speed rotational information and the information on vehicle velocity.

According to a fifth aspect of the present invention, there is also provided an apparatus for judging road surface conditions for judging road surface conditions on which a vehicle is running. The apparatus includes: wheel speed detecting means which detect wheel speed rotational information of tires of driving wheels of the vehicle, a GPS device which receives GPS radio waves and calculates information on vehicle velocity, and a road surface condition judging means which judges road surface conditions during running on the basis of a relationship between the wheel speed rotational information and the information on vehicle velocity.

According to a sixth aspect of the present invention, there is yet further provided a program for judging road surface conditions in which for judging road surface conditions, a computer is made to function as a road surface condition judging means which judges road surface conditions during running on the basis of a relationship between wheel speed rotational information of tires of driving wheels of the vehicle obtainable from wheel speed detecting means and information on vehicle velocity obtainable from a GPS device which receives GPS radio waves.

BRIEF DESCRIPTION OF THE DRAWINGS

FIG. 3 is a view illustrating a relationship between slip ratio and acceleration when running on road surfaces of ceramic tiles, Dorset pebbles and wet concrete.

DETAILED DESCRIPTION

The method and apparatus for judging road surface conditions and the program for judging road surface conditions according to the present invention will now be explained with reference to the accompanying drawings.

Figure 1:
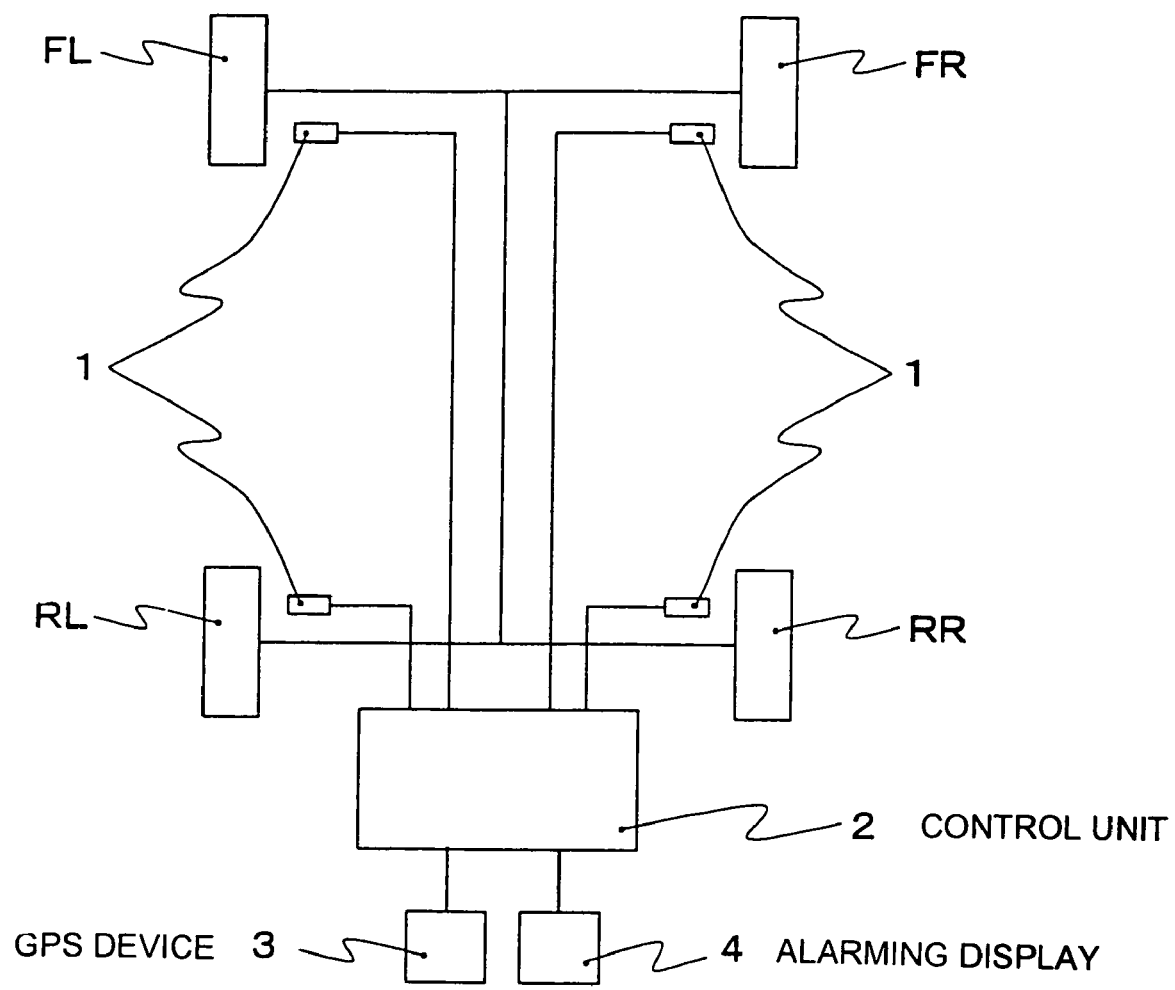
FIG. 1 is a block diagram for illustrating an embodiment of an apparatus for judging road surface conditions according to the present invention.
Figure 2:
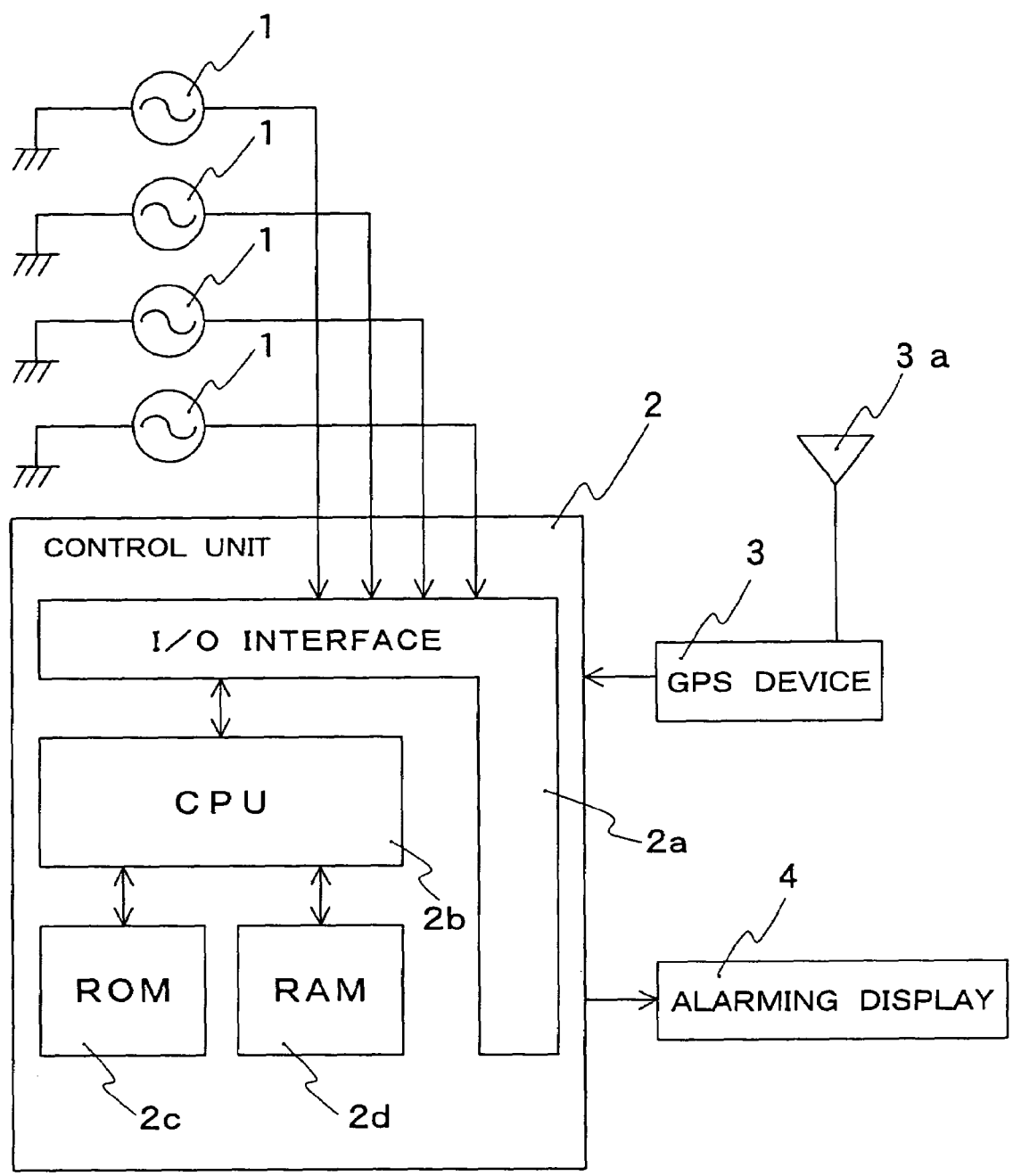
FIG. 2 is a block diagram for illustrating electric arrangements of the apparatus for judging road surface conditions of FIG. 1.

As illustrated in FIGS. 1 and 2, the apparatus for judging road surface conditions according to an embodiment of the present invention is for judging road surface conditions during running on the basis of wheel speed rotational information of four tires FL, FR, RL and RR provided in a four-wheel vehicle, and is equipped with ordinary wheel speed detecting means 1 respectively provided relative to the respective tires.

The wheel speed detecting means 1 might be a wheel speed sensor for measuring wheel speed rotational information on the basis of number of pulses upon generating rotational pulses by using an electromagnetic pickup or similar, or an angular velocity sensor in which power is generated by using rotation such as in a dynamo, wherein the wheel speed rotational information is measured from a voltage thereof. Outputs of the wheel speed detecting means 1 are supplied to a control unit 2 which might be a computer such as an ABS. To the control unit 2, there is connected a GPS device 3 which receives GPS radio waves from a GPS antenna 3a to calculate positional information related to positions and velocities of the vehicle during running. There are further connected a low μ road alarming display 4 which might, for instance, be a display means comprising liquid crystal elements, plasma display elements or CRT for informing a driver of a road of low μ from among road surface conditions (high μ road, intermediate μ road and low μ road).

As illustrated in FIG. 2, the control unit 2 comprises an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

Pulse signals corresponding to the rotational number of the tire (hereinafter referred to as "wheel speed pulse") are output in the wheel speed detecting means 1. In the CPU 2b, rotational angular velocities $F_i$ for the respective tires are calculated on the basis of the wheel speed pulses as output from the wheel speed detecting means 1 at specified sampling periods $\Delta T(\sec)$, for instance, $\Delta T=1$ second.

Since the tires are manufactured to include variations (initial differences) within standards, effective rolling radii of the respective tires (a value obtained by dividing a distance which has been traveled by a single rotation by $2\pi$) are not necessarily identical to one another even though all of the tires are at normal internal pressure. This will result in variations in the rotational angular velocities $F_i$ of the respective tires. Thus, corrected rotational angular velocities $F1_i$ are calculated to cancel variations owing to initial differences. More particularly, corrections are performed to satisfy $F1_1=F_1$ $F1_2=mF_2$ $F1_3=F_3$ $F1_4=nF_4$.

The correction coefficients m and n are obtained as $m=F_1/F_2$ and $n=F_3/F_4$ on the basis of rotational angular velocities $F_i$ when the rotational angular velocities $F_i$ have been calculated on the premise that the vehicle is performing straight-ahead driving. The wheel speed rotational information is indicative of rotational velocities which are calculated upon reading periods of wheel speed pulses of the wheel speed detecting means 1 and the number of pulses at specified time intervals, and the wheel speeds Vi of the tires of the respective wheels are calculated on the basis of $F_{1\,i}$.

As represented by car navigation systems, positioning utilizing global positioning systems (GPS) are generally known in the art for localizing vehicles. Many studies are being made for improving the accuracy of position in frequency bands for civilian use, wherein a technique of improving the accuracy by measuring carrier wave phases of information sent from various satellites is introduced in the Journal of the Institute of Electronics, Information and Communication Engineers (Vol. 82, No. 12).

According to the present invention, information of a vehicle (positional information, vehicle velocity information and the like) is acquired through GPS at a high accuracy for judging conditions of road surfaces on which the vehicle is running. The tendency of slip of the road surface during running is then detected on the basis of the road surface condition, and the driver is alarmed when the road is of low μ.

According to the present embodiment, the device is composed of wheel speed detecting means 1, the GPS device 3 and a road surface condition judging means which judges road surface conditions during running on the basis of a relationship between rotational velocity and positional information.

The GPS device 3 might, for instance, be a VBOX (trade name) manufactured by Racelogic. The VBOX is capable of defining positions at a high accuracy since it employs a position defining method called Kinematic GPS in which correction is performed by utilizing phase differences in carrier waves of satellite radio waves. It should be noted that road surface conditions can be judged directly on the basis of information on vehicle velocity in the case where the vehicle velocity can be calculated with a high accuracy with the use of Doppler effect in the GPS device.

In the present embodiment, there is explained hereinafter an example in which road surface conditions are judged on the basis of positional information in a GPS device which cannot calculate vehicle velocity directly.

The GPS device 3 according to the present embodiment is composed of a distance calculating means which reads the positional information in synchronization with time intervals of velocity detection for calculating rotational velocities and which calculates a moving distance of the vehicle from the positional information, and a vehicle information calculating means which calculates the vehicle velocity and the acceleration of the vehicle from the moving distance. The present embodiment is further provided with a slip rate calculating means which calculates a slip rate from the rotational velocity and the vehicle velocity, and road surface conditions are judged by means of a judging means during running by utilizing the relationship between slip rate and acceleration. Here, the relationship between slip rate and acceleration equals general μ-s curves between tires and road surfaces, and gradients are varied depending on whether it is a high μ road, an intermediate μ road or a low μ road.

It is further desirable to include a moving average processing means which performs moving averaging processes for a specified number of values of the rotational velocity and the velocity or acceleration of the vehicle which have been read per each specified time interval.

According to the program for judging road surface conditions of the present embodiment, the control unit 2 is made to function as the road surface condition judging means which judges road surface conditions during running on the basis of a relationship between the rotational velocities of tires of the driving wheels of the vehicle obtainable from the wheel speed detecting means 1 and the positional information of the vehicle obtainable from the GPS device 3. The control unit 2 is also made to function as the slip rate calculating means which calculates a slip rate from the vehicle velocity calculated upon reading the positional information in synchronization with time intervals of velocity detection for calculating rotational velocities and from the rotational velocity, and the judging means which judges road surface conditions during running on the basis of a relationship between the slip rate and acceleration calculated in the GPS device. It is also made to function as the moving average processing means which performs moving averaging processes for a specified number of values of the rotational velocity and the velocity or acceleration of the vehicle which have been read per each specified time interval.

One example of operations of the apparatus for judging road surface conditions according to the present embodiment will now be explained along steps (1) to (6).

(1) The respective rotational velocities ($V1_n$, $V2_n$, $V3_n$, $V4_n$) of the four wheel tires of the vehicle are calculated.

For instance, wheel speed data obtained at an arbitrary point of time of the respective wheel tires of the vehicle from a sensor such as an ABS sensor are defined to be rotational velocities $V1_n$, $V2_n$, $V3_n$, $V4_n$.

(2) The rotational velocity T of the driving wheels of the vehicle is then calculated. For instance, in the case of a two-wheel-drive vehicle, it might be the average rotational velocities of the driving wheels, and in the case of a four-wheel-drive vehicle, it might be the average rotational velocity of the four wheels. It might alternatively be the rotational velocity of one wheel from among the two or four driving wheels.

(3) The moving distance of the vehicle is calculated from the positional information of the vehicle during running calculated by using the GPS device, and the vehicle velocity $Vf_n$ is obtained thereafter. As stated above, the vehicle velocity $Vf_n$ can be inputted without calculating it from the positional information in the case of GPS device which can calculate the vehicle velocity directly.

(4) Supposing that vehicle velocity data preceding the vehicle velocity $Vf_n$ by one is vehicle velocity $Vf_{n-1}$, the acceleration of the vehicle $Vaf_n$ is given by the following equation (1).

$$Vaf_n = (Vf_n - Vf_{n-1})/\Delta t/G \qquad (1)$$

Here, $\Delta t$ is a time interval (sampling period) between average vehicle velocities $Vf_n$ and $Vf_{n-1}$ calculated on the basis of the vehicle velocity data which is in synchronization with the sampling time of the rotational velocity, and G is acceleration of gravity. In order to reduce variations in data and enable judgment in a short time, the sampling period is required to be not more than 0.1 second. More preferably, the value should be not more than 0.05 second.

(5) The slip rate of the vehicle during running is calculated from the following equation (2). Here, T denotes a rotational velocity of the driving wheels and V the vehicle velocity.

$$S = (T-V)/T \qquad (2)$$

(6) The relationship between the slip rate of the driving wheels of the vehicle and the acceleration of the vehicle is then obtained.

Here, for obtaining the slip rate and the acceleration, the following treatments are performed.

1. For eliminating influences of disturbances owing to concaves and convexes of the road surfaces, a specified number of pieces of data obtained per each sampling period, for instance, 50 pieces of data, undergo moving average processing.

In order to reduce variations in data without reducing the number of data, data are sampled at short sampling periods, for instance, several tens of ms, and data of large variations obtained during the sampling period undergo moving averaging. This moving averaging treatment can be also applied to data of rotational velocity and vehicle velocity.

2. Next, for obtaining a linear relationship between slip rate and acceleration, linear approximation through least square approximation method of a specified number of pieces, for instance, 20 pieces of data, is performed, and this process is peformed per each sampling period.

Consequently, a gradient of the linear approximate expression obtained for each sampling period will correspond to a value indicative of the tendency of slip of the road surface.

While the present invention will now be explained on the basis of examples thereof, the present invention is not to be limited to such examples only.

EMBODIMENT

A four-wheel-drive vehicle (displacement of 2.0 L) was provided. The tire size was 205/55R16. The running conditions for the vehicle were such that road surfaces of different values for the road surface μ, namely ceramic tiles, Dorset pebbles and wet concrete were employed on the Okayama track course owned by Sumitomo Rubber Industries, Ltd. The GPS sensor mounted on the vehicle was a VBOX PRO manufactured by Racelogic. The sampling frequency was 50 Hz.

The vehicle was made to run for approximately 10 seconds on the respective road surfaces. The relationship between the slip rates and accelerations as plotted by using the apparatus for judging road surface conditions stored with the program for judging road surface conditions according to the present embodiment is shown in FIG. 3. It can be understood from FIG. 3 that the gradients of linear approximate expressions differ among the road surfaces and that the gradient becomes larger the lower the μ of the road is.

Accordingly, by judging conditions of road surfaces on which a vehicle is running and employing such information as transmission control information of an automatic transmission system, in an apparatus for detecting decrease in tire air-pressure or a road surface condition judging system, it is possible to improve running performance and stability of running.

As explained so far, according to the present invention, conditions of road surfaces on which a four-wheel-drive vehicle is running can be accurately judged. The present invention is further applicable to two-wheel-drive vehicles as well.

Since the present invention can be easily linked with GPS positional information, it is possible to draft road maps including road surface conditions.

What is claimed is:

1. A method for judging road surface conditions on which a four-wheel-drive vehicle is running, comprising the steps of:

obtaining wheel speed rotational information of driving wheels of the four-wheel-drive vehicle during running from wheel speed detecting means, receiving GPS radio waves to calculate positional information of the four-wheel-drive vehicle, calculating velocity and acceleration of the vehicle from the positional information, calculating a slip rate of the wheels of the vehicle from the wheel speed information and velocity of the vehicle, calculating a linear relationship between vehicle acceleration and the slip rate, judging road surface conditions during running from a gradient of the linear relationship, and providing an output of the road surface conditions.

2. The method of claim 1, wherein the wheel speed rotational information is indicative of rotational velocities which are calculated upon reading periods of wheel speed pulses of the wheel speed detecting means and the number of pulses at specified time intervals; the positional information is read in synchronization with time intervals of velocity detection for calculating rotational velocities to calculate a moving distance of the four-wheel-drive vehicle from the positional information; a vehicle velocity and the acceleration of the four-wheel-drive vehicle are calculated from the moving distance; and the slip rate is calculated from the rotational velocity and the vehicle velocity, and road surface conditions are judged during running by utilizing the relationship between the slip rate and the acceleration.

3. The method of claim 2, wherein moving averaging processes are performed for a specified number of values of the rotational velocity and the velocity or acceleration of the four-wheel-drive vehicle which have been read per each specified time interval.

4. The method of claim 1, wherein a GPS device receives GPS radio waves to calculate information on vehicle velocity.

5. The method of claim 4, wherein the wheel speed rotational information is indicative of rotational velocities which are calculated upon reading periods of wheel speed pulses of the wheel speed detecting means and the number of pulses at specified time intervals; the information on vehicle velocity is read in synchronization with time intervals of velocity detection for calculating rotational velocities; a vehicle velocity and the acceleration of the four-wheel-drive vehicle are calculated from the information on vehicle velocity; and the slip rate is calculated from the rotational velocity and the vehicle velocity, and road surface conditions are judged during running by utilizing the relationship between the slip rate and the acceleration.

6. The method of claim 5, wherein moving averaging processes are performed for a specified number of values of the rotational velocity and the velocity or acceleration of the four-wheel-drive vehicle which have been read per each specified time interval.

7. An apparatus for judging road surface conditions on which a four-wheel-drive vehicle is running, comprising:

wheel speed detecting means which detect wheel speed rotational information of tires of driving wheels of the four-wheel-drive vehicle, a GPS device which receives GPS radio waves and calculates positional information, means for calculating velocity and acceleration of the vehicle from the positional information, means for calculating a slip rate of the wheels of the vehicle from the wheel speed information and velocity of the vehicle, means for calculating a linear relationship between vehicle acceleration and the slip rate, means for judging a road surface condition during running from a gradient of the linear relationship, and a device for providing an output of the road surface conditions.

8. The apparatus of claim 7, wherein the wheel speed rotational information is indicative of rotational velocities which are calculated upon reading periods of wheel speed pulses of the wheel speed detecting means and the number of pulses at specified time intervals; the GPS device further includes a distance calculating means which reads the positional information in synchronization with time intervals of velocity detection for calculating rotational velocities and which calculates a moving distance of The four-wheel-drive vehicle from the positional information, and a four-wheel-drive vehicle information calculating means which calculates a vehicle velocity and the acceleration of the four-wheel-drive vehicle from the moving distance; and the apparatus is further provided with a slip rate calculating means which calculates the slip rate from the rotational velocity and the vehicle velocity, and a judging means which judges road surface conditions during running on the basis of a relationship between the slip rate and The acceleration.

9. The apparatus of claim 8, wherein the apparatus further includes a moving average processing means which performs moving averaging processes for a specified number of values of the rotational velocity and the velocity or acceleration of the four-wheel-drive vehicle which have been read per each specified time interval.

10. The apparatus of claim 4, wherein the GPS device receives GPS radio waves and calculates information on vehicle velocity.

11. The apparatus of claim 10, wherein the wheel speed rotational information is indicative of rotational velocities which are calculated upon reading periods of wheel speed pulses of the wheel speed detecting means and the number of pulses at specified time intervals; the GPS device further includes a four-wheel-drive vehicle information calculating means which reads the information on vehicle velocity in synchronization with time intervals of velocity detection for calculating rotational velocities and which calculates a vehicle velocity and an acceleration of the four-wheel-drive vehicle from the information on the vehicle velocity; and the apparatus is further provided with a slip rate calculating means which calculates the slip rate from the rotational velocity and the vehicle velocity, and a judging means which judges road surface conditions during running on the basis of a relationship between the slip rate and the acceleration.

12. The apparatus of claim 11, wherein the apparatus further includes a moving average processing means which performs moving averaging processes for a specified number of values of the rotational velocity and the velocity or acceleration of the four-wheel-drive vehicle which have been read per each specified time interval.

13. A computer-readable medium storing a program for judging road surface conditions on which a four-wheel-drive vehicle is running, the program, when executed by processor, carrying out a method comprising the steps of:

obtaining wheel speed rotational information of driving wheels of the four-wheel-drive vehicle during running from wheel speed detecting means, receiving GPS radio waves to calculate positional information of the four-wheel-drive vehicle, calculating information on velocity and acceleration of the vehicle from the positional information, calculating a slip rate of the wheels of the vehicle from the wheel speed information and velocity of the vehicle, calculating a linear relationship between vehicle acceleration and the slip rate, judging road surface conditions during running from a gradient of the linear relationship, and providing an output of the road surface conditions.

14. The computer-readable medium of claim 13, wherein the wheel speed rotational information is indicative of rotational velocities which are calculated upon reading periods of wheel speed pulses of the wheel speed detecting means and the number of pulses at specified time intervals, and the program, when executed, further carries out the steps of:

reading the positional information in synchronization with time intervals of velocity detection for calculating rotational velocities to calculate a moving distance of the four-wheel-drive vehicle from the positional information;

calculating a vehicle velocity and the acceleration of the four-wheel-drive vehicle from the moving distance;

calculating the slip rate from the rotational velocity and the vehicle velocity, and judging road surface conditions during running by utilizing the relationship between the slip rate and the acceleration.

15. The computer-readable medium of claim 14, wherein the program, when executed, further carries out the step of performing moving averaging processes for a specified number of values of the rotational velocity and the velocity or acceleration of the four-wheel-drive vehicle which have been read per each specified time interval.

16. The computer-readable medium of claim 13, wherein a GPS device receives GPS radio waves to calculate information on four-wheel-drive vehicle velocity.

17. The computer-readable medium of claim 14, wherein a GPS device receives GPS radio waves to calculate information on four-wheel-drive vehicle velocity.

18. The computer-readable medium of claim 15, wherein a GPS device receives GPS radio waves to calculate information on four-wheel-drive vehicle velocity.

* * * * *